United States Patent [19]

Emanuel et al.

[11] 4,356,230

[45] Oct. 26, 1982

[54] MOLDED PLASTIC PRODUCT HAVING A PLASTIC SUBSTRATE CONTAINING A FILLER AND AN IN-MOLD PLASTIC COATING FIRMLY BONDED THEREON AND A PROCESS FOR ITS MANUFACTURE

[75] Inventors: Peter R. Emanuel, Troy; Syed Salman, Sterling Heights; Gulam Mohiuddin, Brighton, all of Mich.

[73] Assignee: International Telephone and Telegraph Corporation, New York, N.Y.

[21] Appl. No.: 167,250

[22] Filed: Jul. 10, 1980

[51] Int. Cl.³ .......................... B29D 3/02; B32B 9/04
[52] U.S. Cl. ................................... 428/290; 264/250; 264/255; 264/269; 264/328.18; 428/335; 428/423.3; 428/423.7; 428/424.4
[58] Field of Search ................ 264/45.3, 48, DIG. 83, 264/328.18, 250, 255, 269; 428/423.7, 334, 335, 290, 423.3, 424.4

[56] References Cited

U.S. PATENT DOCUMENTS

| | | | |
|---|---|---|---|
| 3,694,530 | 9/1972 | Wolfe | 264/48 |
| 4,073,840 | 2/1978 | Saidla | 264/45.3 |
| 4,081,578 | 3/1978 | Van Essen et al. | 264/255 X |
| 4,235,833 | 11/1980 | Arnason et al. | 264/255 |
| 4,242,306 | 12/1980 | Kreuer et al. | 264/45.3 X |
| 4,245,006 | 1/1981 | Shanoski | 264/255 X |
| 4,257,992 | 3/1981 | Schulte et al. | 264/45.3 |
| 4,282,285 | 8/1981 | Mohiuddin | 264/46.6 X |
| 4,293,659 | 10/1981 | Svoboda | 264/255 X |
| 4,316,869 | 2/1982 | Van Gasse | 264/255 |
| 4,331,735 | 5/1982 | Shanoski | 264/255 X |

*Primary Examiner*—Philip E. Anderson
*Attorney, Agent, or Firm*—James B. Raden; Harold J. Holt

[57] ABSTRACT

A molded part containing plastic substrate and a firmly adherent coating thereon, the plastic substrate containing a filler therein present at least in part in proximity to the surface of the substrate. The coating is transferred from the mold surface to the substrate during the molding operation and during solidification of the molded part. The molded part has a smooth surface as molded and without any subsequent finishing thereof.

16 Claims, No Drawings

MOLDED PLASTIC PRODUCT HAVING A PLASTIC SUBSTRATE CONTAINING A FILLER AND AN IN-MOLD PLASTIC COATING FIRMLY BONDED THEREON AND A PROCESS FOR ITS MANUFACTURE

This invention relates to a plastic molded part and to a process for its production.

In the preparation of plastic molded parts, fillers such as fibrous reinforcement material, are frequently added to the plastic to obtain higher impact strength, greater dimensional stability or for other purposes. The fillers, added, for example, in the form of loose fibers or as a woven or unwoven mat, normally extend to the proximity of the surface of the part and create a rough surface on the as-molded part. The surface can be sanded or subjected to equivalent post-molding treatment to create a smooth finish but this adds considerable expense to the cost of production of the part. Subsequent coatings on the molded part will not produce a smooth surface—the roughness is usually of greater depth than can be covered by any practical coating thickness. The use of loosely woven glass fiber reinforcement in molded polyurethane parts is shown, for example, in U.S. Pat. No. 3,970,732 which issued on July 20, 1976.

Copending U.S. application Ser. No. 149,996, filed May 15, 1980 and now U.S. Pat. No. 4,282,285 and copending U.S. application Ser. No. 162,682, filed June 25, 1980, both assigned to the present assignee, disclose processes for producing injection and compression molded parts having a coating thereon transferred from the mold surface to the substrate while within the mold. The processes there disclosed show the filling of the mold with a reactive plastic molding material and then, prior to molding, spraying the surface of the mold with a coating composition containing a reaction promoter for the reactive molding material. The reaction promoter, which may be a catalyst for the reactive molding material, acts to transfer the coating composition to the substrate during the molding operation so that the shaped part removed from the mold contains a firmly adherent coating of the coating composition.

The present invention involves the discovery that the aforementioned in-mold coating technique may be used to produce a smooth surface on a plastic molded part containing a filler which is present at least in part in proximity to the surface of the substrate and which would by previously known molding techniques produce a rough or uneven surface on the molded part. The in-mold coating process permits transfer of the coating to the substrate during the time the plastic substrate solidifies and while the filler is being locked in place at or near the surface of the substrate. Using prior molding techniques, the filler at or near the surface is locked in place in the substrate before a coating is applied. This results in a rough surface on the molded part which cannot be made smooth by a coating of any practical thickness. By transfer of the coating from the mold surface to the plastic substrate during the molding operation and prior to solidification of the substrate, we have found we can obtain a completely smooth surface on the molded part.

In general, the product of the present invention is a molded part containing a plastic substrate and a firmly adherent coating thereon, the plastic substrate containing a filler therein present at least in part in proximity to the surface of the substrate. The coating has been transferred from the mold surface to the substrate during the molding operation and during solidification of the molded part. The molded part has a smooth surface as molded and without any subsequent finishing thereof. The molded part is produced by coating the surface of the mold, prior to molding the part, with a coating composition containing a reaction promoter for the reactive plastic molding material, introducing the reactive plastic molding material and the filler into the mold, the molding material and filler together comprising the plastic substrate, the reaction promoter in the coating being present in an amount sufficient to transfer the coating composition from the mold surface to the substrate and bond it thereto, molding the part and removing the molded part from the mold. The molded part upon removal from the mold has a smooth surface thereon as molded and without any subsequent surface treatment thereof.

The invention is useful with both injection and compression molded filled or reinforced plastic parts, including parts produced by reinforced reaction injection molding. The compression and injection molding of thermosetting and thermoplastic resins, both with and without fibrous reinforcement, is well known and is described at many places in the literature, as for example, in *Modern Plastics Encyclopedia*, October 1978, Vol. 55, No. 10A, pages 256–261 and 304–313. The invention is particularly useful in reaction injection and compression molding operations because surface finish problems are apt to be greatest with filled parts produced by these techniques. However, it is also useful with other molding operations using reactive molding material including injection and transfer molding and casting. The reinforced reaction injection molding process is very similar to the reaction injection molding process except that the reinforcing material in the form of chopped or milled fibers is incorporated in one or both of two reactive liquid streams used in the process. Alternatively, the reinforcement, in the form of a screen or mat, is laid out in the cavity of the mold or adhered to the core surface of the mold, the mold is closed and the reactants are injected into the mold.

In carrying out the invention, the surface of the mold is first uniformly coated with a coating composition containing a reaction promoter for the reactive polymer in an amount sufficient to transfer the coating composition from the mold surface to the molded part and bond it to the latter. The amount of the reaction promoter will normally range from as little as 0.5% to as much as 10% based on the total coating weight. However, amounts of reaction promoter greater than 10% may be used, although normally they are unnecessary, and amounts even less than 0.05% may be adequate if a strong catalyst or other reaction promoter is employed. The coating plus reaction promoter are conveniently applied to the mold surface by spraying the coating at 30 to 60 psig in a solvent at about 10–35% solids content. In compression and injection molding, the mold surface may range from below ambient temperatures to elevated temperatures, e.g. from 50° to 450° F. In reaction injection molding, the mold surface should be from 90° to 180° F. The process of the invention is useful with a wide variety of metal mold surfaces, as for example, steel, aluminum, chrome and nickel plated steel, electroform nickel and kirksite (a zinc alloy) and with other mold surfaces such as epoxy and silicone. Flash time, for evaporation of thinner after coating the mold surface and prior to molding, will normally vary for compression and injection molding from 15 to about 60 seconds, depending on temperature of the mold and solvent composition and normally will be less than 15 seconds for reaction injection molding.

The substrate is a reactive plastic molding material. By reactive plastic molding material, we intend to identify the starting materials from which the molded part is made, which starting materials undergo polymerization and/or crosslinking during the molding cycle. Included within this definition are the reactant isocyanate and polyol components of polyurethane molding systems and the large number of thermosetting polymers which undergo during the molding cycle further reaction and/or crosslinking in the presence of a reaction promoter which can be a catalyst, a crosslinking promoter or crosslinking initiator. Examples of such reactive thermosetting polymers are polyurethanes, unsaturated polyesters, epoxy resins and phenolics. Typical examples of reaction promoters for polyurethanes are urethane catalysts which may be metal chlorides, amino compounds or organometallic salts such as dibutyltin dilaurate, stannous octoate or phenyl mercuric propionate. Other polyurethane catalysts are disclosed in the aforesaid copending application Ser. No. 149,996. The polyurethanes useful as reactive plastic molding materials for compression and injection molding are not necessarily the same urethane polymers which are used in reaction injection molding. The polyols used in preparing urethane polymers for compression and injection molding are not necessarily capped with ethylene oxide to give high reactivity, as in the case of polyols used in reaction injection molding. However, the catalysts disclosed in copending application Ser. No. 149,996 are useful as reaction promoters with both types of polyurethanes. Epoxy resins are crosslinked by amines, anhydrides, aldehyde condensation products and Lewis acids. Typical catalysts useful as reaction promoters for epoxy resins are diethylene triamine and hexahydrophthalic anhydride. Phenolic polymers are crosslinked by acid catalysts, of which a suitable example is hexamethylene tetramine and by a basic catalyst such as ammonium hydroxide. In the case of polyesters, examples of reaction promoters or as they are known, free radical or crosslinking initiators, are organic peroxides, alkyl peresters and azonitriles. Examples of peroxides are tertiary butyl peroxide, lauryl peroxide and diacyl peroxide; examples of alkyl peresters are tertiary butyl perbenzoate and tertiary butyl peracetate; an example of an azonitrile is 1-t-butyl azo-1-cyano cyclohexane. The foregoing reaction promoters may of course be used alone or in combination.

A particularly useful class of reactive molding materials useful in the invention are the so-called bulk molding or sheet molding compounds. These materials are a composite of specialty polyester resins, and as commercially sold usually contain thickeners, thermoplastic copolymers, styrene, inorganic filler, fiber reinforcement, catalyst, mold release and pigment. The sheet molding compounds are particularly useful in compression molding operations.

The polyester resin is formed from the condensation polymerization of anhydrides, dicarboxylic acids, or polycarboxylic acids with bifunctional or polyfunctional alcohols or polyols. A wide variety of polyesters are used with varying properties to meet specific performance requirements. The thermoplastic copolymers are a minor part of the compounds and are formed from the addition polymerization of one or more types of monomers. Some important addition polymers are acrylic, polyethylene, polypropylene, polyvinylchloride, polyvinylacetate, polymethylmethacrylate and polystyrene. The purpose of using thermoplastics in the compound is for their performance as low shrink additives in the polyester molding compound. The monomer styrene used in the formulation is a crosslinking reactant. It crosslinks or bonds with the polyester forming a rigid tightly bonded structure. Other crosslinking monomers such as vinyl toluene or diallyl pthalate can also be used. Fillers are normally inorganic powders, usually processed from minerals commonly found in the ground, such as calcium carbonate and aluminum silicate. The thickeners are used to increase the viscosity of the compound and the most commonly used are oxides and hydroxides of calcium and magnesium. Internal mold release agents such as zinc stearate and calcium stearate are unnecessary for the purpose of the invention but may be present in the commercial formulation. Pigments are added for imparting colors. They are essentially metallic oxides such as $TiO_2$. The reaction promoters that can be used with these polyester resins are free radical initiators. These are usually selected based on the temperature of curing, half life and activity. The glass reinforcement in these formulations is used to improve certain properties, most important of which are impact and tensile strength and coefficient of thermal expansion.

In the case of reaction injection molding, the polyurethane reactants are fed into the mold and reacted during the molding cycle. In the case of compression and injection molding, the plastic molding material introduced into the mold is a reactive polyester, epoxy resin or other polymer which is cured or crosslinked during the molding cycle. The reaction promoter used in the coating is a polyurethane catalyst in the case of reaction injection molding or a catalyst, crosslinking promoter or initiator for curing the resin in the case of compression or injection molding.

A more detailed description of the processes as applied to reinforced reaction injection molded parts is as follows. The two liquid components used in reaction injection molding are polyol and isocyanate. If a loose fibrous reinforcement is used in the process, a slurry of the reinforcement fibers is prepared with one or both of the liquid components. Preferably, however, the reinforcement is added to the polyol because it is more viscous and thus less prone to settle. The slurry is brought to the desired component temperature, and maintained by constantly agitating, heating and recirculating. The recirculating and agitation help keep the fibers from settling. The two liquid streams, one isocyanate and the other polyol, with the reinforcement if used, is metered exactly in the desired weight ratio and fed into a self-cleaning type impingement mix-head under 2,000–3,000 psig pressure. This mix-head is specially designed to handle highly abrasive materials. The two reactive high pressure liquid streams impinge upon each other in the mixing chamber of the mix-head and the resulting mixture is pushed into the mold with the help of a hydraulically operated piston, which simultaneously cleans the mixing chamber because of the close tolerances.

Prior to the injection in the mold, the mold is cleaned thoroughly, brought to the desired molding temperature, which is in most cases between 140°–160° F. The mold cavity and/or core surface is coated with the coating composition by spraying with a spray gun to give a desired coating thickness, which may vary from 0.1 to 2.5 mils or more but normally is less than 0.5 mil with a particulate filler and less than 2.0 mils with a fibrous reinforcement as filler. (These coating thicknesses also apply to molded products produced by other molding processes.) A flash off time to evaporate the solvent of 10 to 15 seconds is allowed to dry off the coating.

If a continuous reinforcement, in the form of a screen or mat is used, it is laid in the cavity or is attached to the core part of the mold after the coating is applied. If desired, means can be provided in the mold to hold the mat. A double parting line can also be provided to the mold, if required, to avoid any leakage of the urethane material and for proper sealing. Then the mold is closed and held under 50 to 150 tons of clamping force in a mechanical clamp. The reaction mixture is injected from the mix-head attached to the mold. The reactive mixture injected may or may not have fibrous reinforcement. The reaction mixture flows into the mold, and encapsulates the mat reinforcement and simultaneously is coated with the coating which was sprayed onto the mold surface. The reactive mixture solidifies and takes the shape of the mold. The part is demolded in seconds to a few minutes depending upon the cure time. The reinforcement and coating become an integral part of the molded part. The coating does not allow the reinforcement to show at the surface and provides an excellent surface finish. The product thus produced containing a continuous mat reinforcement has very low coefficient of thermal expansion, very high impact properties, high mechanical strength and desired rigidity for automotive and non-automotive structural applications. This product thus has superior thermal, mechanical and physical properties coupled with excellent surface finish compared to parts containing only loose fiber reinforcement.

After demolding from the mold, the part is usually trimmed and then usually post cured by application of heat, as for example, at 250° F. for one hour in a hot air forced circulation oven. The post curing helps complete the chemical reaction. Since there is no mold release used in the molding operation, the part does not have to go through the extensive cleaning and drying operation and thus saves considerable amount of time and energy. The part can then be further coated, if desired, to give the desired gloss level and color matching. In many non-automotive applications this step may not be necessary since the part already has a coating on the part surface.

Further disclosure of the details of the in-mold coating process and its applicability to reaction injection molding processes may be obtained from the aforesaid copending U.S. application Ser. No. 149,996 filed May 15, 1980 U.S. Pat. No. 4,282,285. Further disclosure of the details of the in-mold coating process and its applicability to compression and injection molding processes may be obtained from the aforesaid copending U.S. application Ser. No. 162,682 U.S. Pat. No. 4,350,739. The disclosures of these applications are hereby incorporated by reference in this application.

The coating may be any decorative or protective coating of the type applied by conventional coating technology to molded parts. The coatings may be either a thermoplastic or thermosetting polymer, with or without a plasticizer. The coating should of course be capable of withstanding the molding temperatures without decomposing or deteriorating. Among the useful coatings included within the foregoing description are, for example, acrylic and acrylic ester polymers, prereacted or blocked urethane polymers, saturated and unsaturated polyesters, epoxy esters, cellulose esters, polyolefins, vinyl and vinyl-melamine polymers and mixtures of the foregoing polymers with each other or with other coating compositions. A preferred class of coatings for polyurethane substrates are those based on urethane or acrylic polymers. For polyesters, a preferred class of coatings are those based on urethanes or polyesters. The coating may be used either as protective coatings or with a pigment as a paint coating. A particularly significant class of coatings are paint primers. The paint primers may be applied within the mold and the molded part thereafter top coated after removal from the mold.

The filler materials useful in the invention include any fillers used in the fabrication of molded plastic parts and which by known molding techniques would create unevenness on the surface of the parts. Many such fillers are of course known including those added as reinforcement, those added to improve or otherwise modify the properties of plastics and those added as diluents or extenders to increase the bulk or weight or to reduce the use of expensive plastics. They may be organic or inorganic, particulate, powdered or continuous, examples of the latter being a mat or woven cloth. Illustrative but not limiting examples of fillers are fibrous materials such as carbon fibers, fibers of a metal such as steel or aluminum, glass fibers such as milled or chopped glass, glass mats or fiberglass, fibers of synthetic polymers such as polyester, acrylic or nylon fibers. The fibrous reinforcement may contain fibers of any size or length of the type used in reinforced plastics. The fillers may be treated with a coupling agent for better wettability. The invention also contemplates the combined use of both powders or loose fibrous reinforcement and a continuous mat or screen reinforcement in a single molded part. In addition to fibrous reinforcement, the filler may also be a particulate filler such as carbon, sand, wood flour, glass beads, fly ash or a mineral filler such as clay, talc, mica, silica or other siliceous material. The proportions of filler may vary widely, depending on the type and form of filler used. It is only necessary that the filler be present in an amount sufficient to be present at least in part in proximity to the surface of the plastic substrate such that, in the absence of the present invention, a rough or imperfect surface would result. Normally the amount of filler will range from 2 to 60%, usually from 5 to 40% by weight, based on the weight of the molded part. However, this range is a practical range of usage and is not intended to be limiting.

The following examples illustrate the practice of the invention. All parts and percentages, unless otherwise indicated, are by weight.

EXAMPLE 1

This example illustrates the reaction injection molding of a glass mat reinforced polyurethane part. The resin component was ethylene oxide capped poly (oxypropylene) glycol grafted with 20 weight percent acrylonitrile polymer and ethylene glycol as chain extender, and contained 0.05–0.075% dibutyltin dilaurate as catalyst. The isocyanate was a prepolymer of 4,4'-diphenylmethane diisocyanate. The isocyanate contained 4% by weight of Freon II (a trademark for a fluorocarbon) as a blowing agent.

The polyol and isocyanate were brought to 50° C. and 24° C. respectively and then mixed at 2000 psig in each feed line to the mixer. The ratio of isocyanate to polyol resin was 0.97 by weight. Nucleation of resin by mixing with air brought the specific gravity of the reaction product to one and facilitated better mixing of the two components. The high pressure recycle time for the two component streams was 5 seconds before injecting into the mold. The two liquid components did not contain any fibrous reinforcement. The mold surface was thoroughly cleaned with a solvent soaked rag. The mold surface was then uniformly sprayed at 30 psig with a paint primer coating. The coating consisted of nitrocellulose, a polymethylmethacrylate resin, monoethyl ether acetate as the plasticizer and a pigment to impart the desired color. The coating was mixed with an equal part by weight of thinner. The coating contained 1% by weight of dibutyltin dilaurate as the catalyst. Then the glass mat (1½ ounces per square foot) was laid into the mold cavity. The mold in this case was an automobile bumper fascia. The mold was closed and clamped in a press. The two reactive streams of polyol and isocyanate were injected through the mix-head into the mold which was pre-heated and maintained at 140° F. The part was demolded one minute after injection. The part thus obtained had a continuous glass mat reinforcement and a coating on the surface which was firmly adherent to the part surface. A number of parts were made in the same way and then post cured at 250° F. for one hour. The parts were then tested for physical and mechanical properties, impact strength, and sag and compared with the parts made without any reinforcement under the same processing conditions. All the properties showed significant improvement, ranging as high as five to ten times greater than the properties of the same parts without reinforcement. The parts had excellent surface smoothness.

EXAMPLE 2

This example illustrates the preparation by compression molding of a molded plaque having a polyester substrate and a polyurethane coating. A 12-ton hydraulic press with electrically heated platens and an aluminum mold with matched die surfaces was used for molding an unsaturated polyester compound by compression molding. The formulation used for this example contained 60 parts of unsaturated polyester dissolved in styrene monomer (64% polyester, 36% styrene), 40 parts of a thermoplastic copolymer as a low shrink additive, 1.5 parts of tertiary butyl perbenzoate as crosslinking agent, 4.5 parts of zinc stearate mold release (not needed but present in the commercial formulation), 140 parts of calcium carbonate, 25 parts of aluminum silicate, 0.5 parts of a grey pigment, 4.5 parts of magnesium oxide thickener and 25% of the total weight of the formulation of ½" loose glass fibers.

The cavity and core of the mold was uniformly sprayed with a conventional air pressure spray gun at 45 psig to place a coating 0.5-1 mil thickness on the mold surface. The coating was a urethane type paint primer which was thinned with one-half part by weight of thinner to produce a 21% by weight solids content paint composition. The paint primer contained a blocked polyurethane, a paint curing agent to cure the urethane (in the proportion of 6 parts polyurethane to one part of curing agent), a plasticizer and a color imparting pigment.

The paint primer contained 5% by weight of tertiary butyl perbenzoate as a reaction promoter for the unsaturated polyester to transfer the coating composition from the mold surface to the molded part and bond it to the latter. The mold surfaces were sprayed with the paint primer and allowed to flash for 30 seconds (time for solvent evaporation). The unsaturated polyester compound was charged into the mold cavity and the mold closed. The mold temperature was 250° F. A clamping pressure of 5 tons was applied to the mold. After three minutes of curing the mold was removed from the clamp and the part was removed from the mold. An examination of the resulting molded product showed that the coating, sprayed onto the mold surface, had transferred onto and bonded to the molded part. The coating was approximately 0.5-1 mil in thickness and displayed excellent filling and adhesion characteristics on the plastic part. The surface of the plastic part was completely smooth and free of roughness.

EXAMPLE 3

Example 2 was repeated using a urethane paint primer as the coating except that it was reduced to 27% solids by mixing with a 50%/50% xylene/toluene solvent. The paint primer contained 5% by weight of 1-t-butyl azo-1-cyano cyclohexane as a reaction promoter for the unsaturated polyester to transfer the coating composition from the mold surface to the molded part and bond it to the latter. The coating was sprayed onto the mold cavity and core. Flash off time was 30 seconds. Mold temperature was 300° F. Demolding time was 3½ minutes. Paint adhesion, coverage of the plastic substrate and surface smoothness were excellent.

EXAMPLE 4

Example 2 was again repeated using the same coating except that it contained 5% of t-butyl peroxy isopropyl carbonate as the reaction promoter. The coating was sprayed onto the mold core. Flash off time was 30 seconds. Mold temperature was 300° F. Demolding time was 4 minutes. Once again, paint adhesion, coverage and surface smoothness were excellent.

EXAMPLE 5

This example illustrates the reaction injection molding of a 1/16" milled glass reinforced polyurethane fender. The resin component was a blend of ethylene oxide capped poly (oxypropylene) glycol with diamine chain extender and 0.05-0.75% dibutyltin dilaurate as catalyst and contained 1/16" milled glass suspended in it. The isocyanate was a prepolymer of 4,4'-diphenylmethane diisocyanate to give a free NCO of 22.6%. The polyol slurry and isocyanate were brought to 32° C. and then metered and fed into a self cleaning impingement mix-head, where the two streams impinged upon each other at 2000 psig and pushed into the mold. The mold was a steel mold heated to 55° C. Prior to injecting the materials, the mold surface was coated with a paint primer coating containing 1% dibutyltin dilaurate as reaction promoter. The coating composition was the same as that of Example 1. The part demolded in one minute, had 10% by weight of 1/16" milled glass in polyurethane with the primer paint coating firmly adhered to the part surface giving a highly smooth surface.

EXAMPLE 6

Example 1 was repeated using a conventional wax mold release on the mold surface prior to injecting with polyol and isocyanate in place of the paint primer coating. Surface roughness of the molded part made it impossible to obtain a high gloss finish with a paint coating of reasonable thickness.

We claim:

1. A molded part containing a plastic substrate and a firmly adherent coating thereon, the plastic substrate containing a continuous fibrous reinforcement material therein present at least in part in proximity to the surface of the substrate, said coating having been transferred from the mold surface to the substrate during the molding operation, said molded part having a smooth surface as molded and without any subsequent finishing thereof.

2. The molded part of claim 1 in which the fibrous reinforcement material is glass.

3. The molded part of claim 4 in which the glass reinforcement is in the form of a continuous glass mat.

4. The molded part of claim 1 in which the plastic substrate is a polyurethane.

5. The molded part of claim 1 in which the plastic substrate is a polyester.

6. The molded part of claim 1 in which the coating is a polyurethane.

7. The molded part of claim 1 in which the coating is an acrylic polymer.

8. The molded part of claim 1 in which the coating has a maximum thickness of 2.0 mils.

9. A process of producing a molded part containing a plastic substrate and a firmly adherent coating thereon, the plastic substrate containing a continuous fibrous reinforcement material therein present at least in part in proximity to the surface of the substrate, said process comprising coating the surface of a mold, prior to molding said part, with a coating composition containing a reaction promoter for a reactive plastic molding material but not for said coating, introducing the reactive plastic molding material and the filler into the mold, said molding material and filler together comprising said plastic substrate, said reaction promoter in said coating being selected from the group consisting of a catalyst, a crosslinking promoter and a crosslinking initiator for said reactive plastic molding material and being present in an amount sufficient to transfer said coating composition from said mold surface to said substrate and bond it thereto, molding said part and removing said part from the mold, said molded part upon removal from the mold having a smooth surface thereon as molded and without any subsequent surface treatment thereof.

10. The process of claim 9 in which the process is reaction injection molding and the reactive plastic molding material is a polyurethane.

11. The process of claim 9 in which the process is compression molding and the reactive plastic molding material is a polyester.

12. The process of claim 10 in which the reaction promoter is dibutyltin dilaurate.

13. The process of claim 11 in which the reaction promoter is a free radical initiator.

14. The process of claim 13 in which the reaction promoter is an organic peroxide.

15. The process of claim 13 in which the reaction promoter is an alkyl perester.

16. The process of claim 13 in which the reaction promoter is an azonitrile.

* * * * *